United States Patent [19]
Galvan

[11] Patent Number: 5,286,377
[45] Date of Patent: Feb. 15, 1994

[54] EVAPORATIVE COOLER WATER TREATMENT DEVICE

[76] Inventor: James Galvan, Sp. D9, HCR-2, Box 1600, Rosamond, Calif. 93560

[21] Appl. No.: 942,224

[22] Filed: Sep. 9, 1992

[51] Int. Cl.$^5$ .............................................. C23F 13/00
[52] U.S. Cl. .................... 210/198.1; 210/205; 210/206; 210/499; 422/264; 422/278; 261/DIG. 3; 261/DIG. 46
[58] Field of Search ............ 422/264, 261, 278; 261/DIG. 46, DIG. 3; 210/198.1, 205, 206, 696, 499

[56] References Cited

U.S. PATENT DOCUMENTS

| | | | |
|---|---|---|---|
| 2,381,354 | 8/1945 | Larson | 210/205 |
| 2,419,845 | 4/1947 | Merrick | 422/278 |
| 2,709,522 | 5/1955 | Osborne | 210/198.1 |
| 2,986,340 | 5/1961 | Webb | 239/315 |
| 3,191,915 | 6/1965 | Goettl | 261/97 |
| 3,507,624 | 4/1970 | Schneider et al. | 422/278 |
| 3,522,882 | 8/1970 | Dykes | 210/198.1 |
| 3,974,071 | 8/1976 | Dunn et al. | 210/696 |
| 4,250,910 | 2/1981 | King | 422/261 |
| 4,294,280 | 10/1981 | Tom | 137/268 |
| 4,603,109 | 7/1986 | Lillo | 435/41 |
| 4,666,682 | 5/1987 | Mayer et al. | 422/266 |
| 4,725,386 | 2/1988 | Gullas | 210/696 |
| 4,898,202 | 2/1990 | Craig | 137/268 |
| 4,957,134 | 9/1990 | Craig | 137/268 |
| 5,066,468 | 11/1991 | Arnold et al. | 210/205 |
| 5,204,006 | 4/1993 | Santoli | 210/696 |

Primary Examiner—Stanley S. Silverman
Assistant Examiner—Robert James Popovics
Attorney, Agent, or Firm—Richard C. Litman

[57] ABSTRACT

A water treatment device for use with evaporative coolers provides treatment of the water supply for such coolers. The device may be installed in series with the cooler in the water supply line and does not require any modification to the evaporative cooler itself. The device has a central housing having an interior divided by a longitudinal baffle, which provides a water inlet side and a water treatment side. A chemical insert, preferably formed to closely fit the interior of the treatment side, is installed in the treatment side of the device, and water is caused to flow from the water supply line to the inlet of the device, downward through the inlet side, and then upward through and past the chemical insert in order to provide maximum exposure of the surface of the insert to the water to be treated. The treated water then flows through an outlet and then through to the evaporative cooler. The chemical insert preferably includes one or more salt compounds for the prevention of mineral deposit buildup in the pads of the evaporative cooler, but may include antibacterial and/or fungicidal agents, scents, etc.

10 Claims, 1 Drawing Sheet

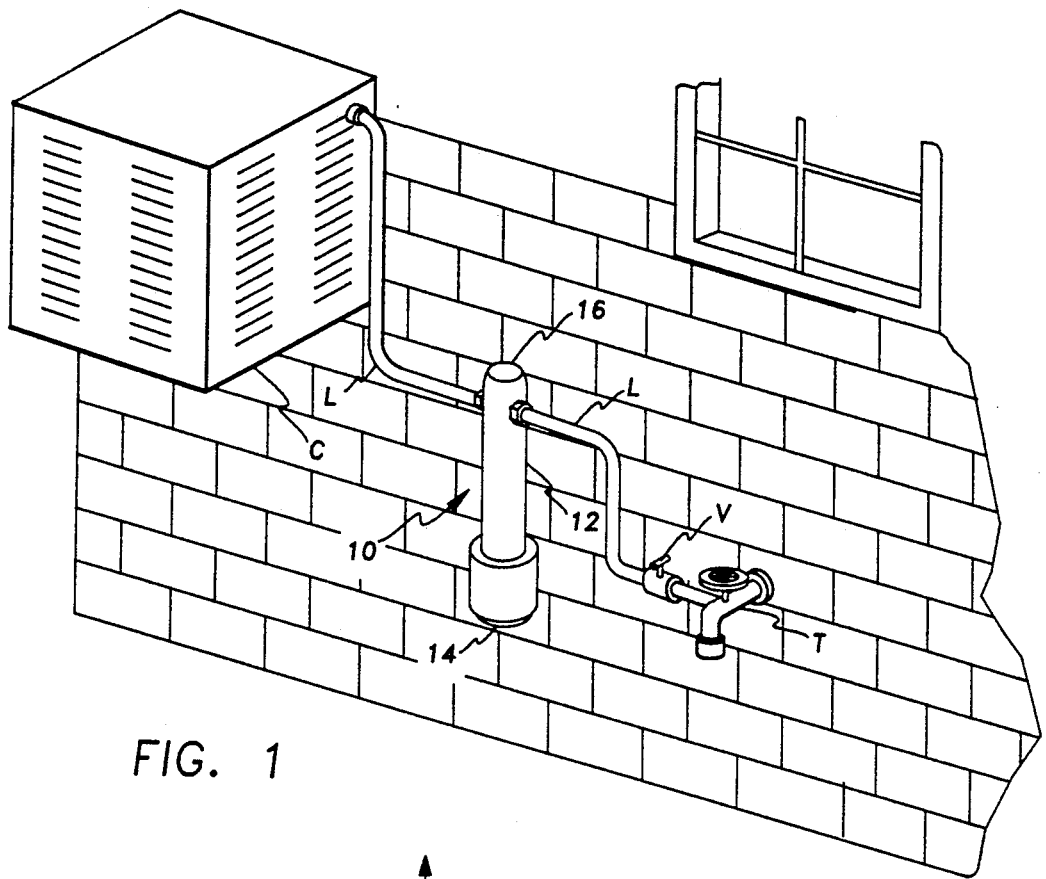
FIG. 1
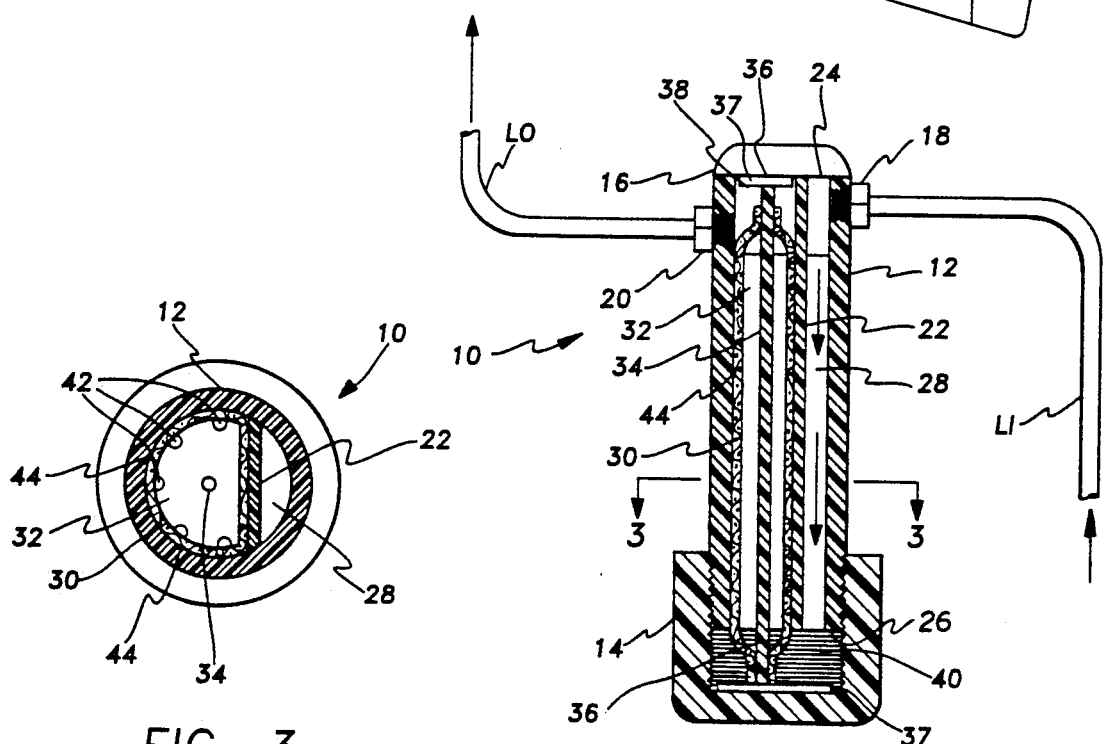
FIG. 3
FIG. 2

EVAPORATIVE COOLER WATER TREATMENT DEVICE

FIELD OF THE INVENTION

This invention relates generally to water treatment devices, generally known as water softeners, and more specifically to such a device which may be used to treat the water supply for an evaporative cooler.

BACKGROUND OF THE INVENTION

While refrigerated air conditioning systems are almost universally known, the earliest mechanized method of cooling a space was by means of the evaporative cooler. Such coolers operate by wetting down a porous pad or pads with water, and forcing air through the wet pads. The evaporation of the moisture from the pads due to the air moving through the pads, results in a reduction of the temperature of the air. Such systems are relatively efficient in areas where the climate is relatively dry, due to the greater amount of moisture the air can absorb and therefore a relatively large drop in temperature as the air is humidified by the evaporating moisture, and further due to the additional humidity which is added to the air during the process. In dry climates the additional humidity can prove beneficial in many circumstances.

However, in areas such as the southwest where such evaporative cooling systems can operate at their greatest efficiency, it is common for water supplies to be relatively "hard," i.e., for the water to contain a relatively high level of dissolved minerals. When evaporation occurs, such hard water will leave deposits of the previously dissolved or suspended minerals, such as various compounds of iron, calcium, etc.

Such deposits will, over the course of time, block water flow through relatively small passages. This is well known in such devices as shower heads and the like. Much the same phenomenon occurs in the pads contained in evaporative coolers under similar circumstances, in that the evaporation of the hard water in the cooler pads will leave mineral deposits which eventually at least partially block the passage of air through the pads. Moreover, the surface area of the pad material is reduced due to the mineral buildup, resulting in less efficient evaporation. Other cooler components may also be blocked or corroded due to deposit buildup.

While water softening devices are known, they are generally intended for use in an entire household water system, or in combination with the line supply for a specific location, such as at a kitchen sink. Applicant is aware of only one other device intended for use with an evaporative cooler, which device is installed within the cooler, as will be discussed further below.

The need arises for a water softening or treatment device for the treatment of the water supply for an evaporative cooler. The device must be capable of being added to an existing evaporative cooler without modification to the cooler. A relatively simple inline installation is desirable, in order to confirm delivery of a treated water supply to all components of the cooler.

DESCRIPTION OF THE RELATED ART

U.S. Pat. No. 2,986,340 issued to E. C. Webb on May 3 1961 discloses a Device For Supporting And Positioning A Water Conditioning Pellet. The device is intended primarily for use in such articles as shower heads and the like, and does not lend itself to use in the environment of the present invention.

U.S. Pat. No. 3,191,915 issued to G. Goettl on Jun. 29, 1965 discloses a Chemicals Dispenser for Evaporative Coolers. The device is primarily intended to distribute a wetting agent to the pads of an evaporative cooler, rather than softening chemicals. The device is unsuitable for use in the distribution of softening agents, due to the valves and/or other components, upstream of the device which would not receive treatment and would therefore still be vulnerable to mineral or chemical build-up. Moreover, the device must be used in combination with a specially constructed or modified evaporative cooler, unlike the present invention.

U.S. Pat. No. 4,294,280 issued to M. D. Tom on Oct. 13, 1981 discloses an Apparatus For Producing And Dispensing Detergent Solutions. The device includes a valve to divert water flow over the detergent block, or alternatively to bypass the detergent block. No relationship to the present invention is seen.

U.S. Pat. No. 4,603,109 issued to E. Lillo on Jul. 29, 1986 discloses a Method And Apparatus For Contacting Reactants In Chemical And Biological Reactions. The device is a canister with a cylindrical microporous ceramic material contained within. No relationship to the present invention is seen.

U.S. Pat. No. 4,666,682 issued to J. L. Mayer et al. on May 19, 1987 discloses a Dispenser For Solid And Powdered Detergent. The device is intended for mixing a powdered detergent with water prior to passing the solution into an automatic dishwasher. The water spray and other features provided bear no relationship to the present invention.

Finally, U.S. Pat. Nos. 4,898,202 and 4,957,134 issued to J. R. Craig on Feb. 6, 1990 and Sep. 18, 1990 both disclose a Fertilizer Container For Sprinkler Systems. The device of the Craig patents includes a double walled container which provides a two stage dissolving action for the fertilizer product contained therein. The device is unlike the present invention in structure or function.

None of the above noted patents, either singly or in combination, are seen to disclose the specific arrangement of concepts disclosed by the present invention.

SUMMARY OF THE INVENTION

By the present invention, an improved device for the treatment of the water supply for an evaporative cooler is disclosed.

Accordingly, one of the objects of the present invention is to provide a water treatment device which may be installed in the water supply line for an evaporative cooler, separate from the cooler itself.

Another of the objects of the present invention is to provide a water treatment device which provides for full flow of water through and around the chemical element contained therein, by means of a specifically patterned flow path.

Yet another of the objects of the present invention is to provide a water treatment device in which the inner components, including any chemical element contained therein, are easily accessible.

Still another of the objects of the present invention is to provide a water treatment device which is of economical construction.

A further object of the present invention is to provide a water treatment device which provides for the spacing of any chemical element contained therein, from the walls and ports of the container interior for proper water flow.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a perspective view of the present invention connected to the water supply for an evaporative cooler.

FIG. 2 is a cross sectional view showing the interior of the device and various components.

FIG. 3 is a cross sectional view along line 3—3 of FIG. 2, showing an alternate view of the interior details.

Similar reference characters designate corresponding parts throughout the several figures of the drawings.

DESCRIPTION OF THE PREFERRED EMBODIMENT

Referring now to the drawings, particularly FIGS. 1 and 2 of the drawings, the present invention will be seen to relate to a water treatment device 10 for use in the prevention of the buildup of minerals and other deposits in an evaporative cooler such as C. Such coolers C are supplied with water from a water supply line L, which line L is generally connected to an existing water tap T. Generally, a shutoff valve V is located adjacent to tap T.

Device 10 is installed in line L between tap T and cooler C, in order to supply treated water to all components of cooler C. Line L will thus have an inlet side LI and an outlet side LO relative to device 10, as shown in FIG. 2. This installation has the further advantages of requiring no modification of cooler C, and is relatively simple to perform.

FIG. 2 provides a view of the construction and internal components of device 10. Device 10 will be seen to be formed of a central housing 12, with a lower end cap 14 secured thereto. Upper end closure 16 is preferably formed as a monolithic unit with central housing 12. Components 12, 14 and 16 of device 10 are preferably formed of a plastic material, such as readily available PVC pipe components, for economy, durability, water tightness, and corrosion resistance. Obviously, other materials may be used as desired or required. Lower end cap 14 may be threaded onto central housing 12, or otherwise secured to housing 12. Whatever method is used to secure end cap 14 to housing 12, the end cap 14 must be relatively easily removable from central housing 12, in order to service or replace internal components and chemicals as necessary. Preferably, lower end cap 14 is easily removable from and installable upon central housing 12.

The upper end of central housing 12 adjacent to upper end closure 16 includes a water inlet fitting 18 and a water outlet fitting 20. Inlet fitting 18 is connected to inlet line LI from tap T, while outlet fitting 20 is connected to outlet line LO which continues to cooler C. Inlet fitting 18 is positioned slightly higher than outlet fitting 20 when device 10 is in a vertical position, in order to preclude any backflow should such a potential condition develop.

A baffle 22 extends from the inner surface 24 of upper end closure 16, downward to the lower edge 26 of central housing 12, in order to control the flow of water through device 10 as will be explained further below. Baffle 22 divides the interior of housing 12 into an inlet side 28 and a treatment side 30, and is positioned nearer one side of housing 12 in order to provide a larger volume for the containment of a chemical insert 32. As inlet side 28 of housing 12 provides no appreciable resistance to water flow, while any chemical insert 32 will tend to cause a resistance in flow as water flows around and through it, a smaller volume is required for inlet side 28 than for treatment side 30. In the preferred embodiment of the present invention, baffle 22 is located halfway between the central axis and the circumferential inner wall of housing 12, resulting in a volume for treatment side 30 of some 5.5 times greater than the volume for inlet side 28. Alternatively, the difference between the two volumes may be varied by positioning baffle 22 as desired, depending upon the nature of the chemical insert used, the flow of water through device 10, and other variables. The flow of water thus provided will be seen to be downward from inlet 18 through inlet side 28 of housing 12, through lower circulation space 38, upward through treatment side 30 of housing 12, and out through outlet fitting 20, in a generally U-shaped path. The upward side of the U-shaped flow path will be seen to flow completely through treatment side 30 of housing 12, and therefore through any chemical insert 32 which may be contained therein.

Chemical insert 32 is preferably formulated to "soften" any water passing therethrough, in order to preclude buildups of mineral deposits upon surfaces from which the water is evaporated. Salts of various compositions are commonly used for such purposes. Insert 32 may also contain chlorinated or other chemicals to serve as fungicides or antibacterial agents, as well as one or more fragrances and/or other ingredients.

Insert 32 may be formed around a rod 34, which rod 34 provides extensions 36 beyond the upper and lower ends of insert 32 in order to provide an upper circulation space 38 and lower circulation space 40 at each end of insert 32 to ensure proper water flow through and around insert 32. Rod 34 is further provided with discs 37 at each rod end 36, which discs 37 conform closely to the cross sectional shape of the interior of central housing 12. Discs 37 serve to prevent rod 34 from being displaced to one side of the interior of central housing 12 as insert 32 is dissolved, thus providing a maximal flow space around insert 32.

Insert 32 is provided with a cross sectional shape generally in the form of a truncated circle, in order to closely conform to the shape of the inner wall of housing 12 and baffle 22. Additional longitudinal channels 42 are provided along the circumferential surface of insert 32, to provide for water flow. Obviously, other shapes, pellets, etc. may be used in combination with device 10 if desired.

As insert 32 is slowly dissolved by the water circulating through device 10, portions may be washed away and cause outlet 20 to be blocked. To preclude such an occurrence, a screen or mesh 44 is provided around insert 32. Screen 44 is secured to the upper and lower extensions 36 of rod 34 in order to maintain the proper positioning of insert 32 as it is dissolved.

Water treatment device 10 is installed in the water supply line L for an evaporative cooler C as described above. Shutoff valve V is closed to preclude flow through device 10 during maintenance or service.

Lower cap 14 is removed from the base of housing 12, and an insert 32 including a rod 34 with discs 37 and surrounding screen or mesh 44 is installed within the treatment side 30 of housing 12. Lower cap 14 is again installed upon housing 12, valve V is opened, and device 10 will automatically treat any water flowing therethrough to preclude mineral deposit buildup and/or mold or other undesirable organic matter from developing within the pads or other areas of the evaporative cooler C with which it is installed. The series installation of device 10 upstream of cooler C ensures that all components of cooler C which handle any water flow, will be provided with treated water in order to preclude the above mineral and/or organic buildup problems. Further, no modification of an existing cooler C is required in order to provide the above benefits.

It is to be understood that the present invention is not limited to the sole embodiment described above, but encompasses any and all embodiments within the scope of the following claims.

I claim:

1. A water treatment device in combination with an evaporative cooler, said evaporative cooler having a water supply line extending from a water supply source to said evaporative cooler, said water treatment device comprising;

a central housing having an upper end, a lower end, and a hollow interior, said hollow interior longitudinally divided by a longitudinal baffle having an upper and a lower end to provide an inlet side and a treatment side within said central housing, a lower end cap providing removable closure means on said central housing lower end and including a lower circulation space therein connecting said inlet side and said treatment side, an upper end closure providing closure means to said central housing upper end with said central housing upper end including a water inlet and a water outlet and having an inner surface immediately adjacent said upper end of said baffle, a water treating chemical insert installed within said treatment side, whereby said water inlet, said inlet side, said circulation space within said lower cap, said water treating chemical insert installed within said treatment side, and said water outlet provider means for treatment of water flowing therethrough to said evaporative cooler.

2. The water treatment device of claim 1 wherein:

said water treating chemical insert comprises one or more salt compounds for the removal of dissolved minerals in the water flowing therethrough.

3. The water treatment device of claim 1 wherein;

said water treatment device is installed within a water supply line between the water supply source and said evaporative cooler, thereby providing a water line inlet side of a water supply line connected to said water inlet of said water treatment device and a water line outlet side of a water supply line connected to said water outlet of said water treatment device.

4. The water treatment device of claim 1 wherein;

said water inlet of said water treatment device is positioned higher than said water outlet of said water treatment device.

5. The water treatment device of claim 1 wherein;

said longitudinal baffle within said central housing is offset toward said water inlet side and away from said water treatment side, thereby providing a smaller volume for said water inlet side of said central housing relative to said water treatment side of said central housing.

6. The water treatment device of claim 5 wherein;

said offset of said longitudinal baffle within said central housing provides a volume for said water treatment side of said central housing of five and one half times the volume for said water inlet side of said central housing.

7. The water treatment device of claim 1 wherein;

said water treating chemical insert is formed to closely conform to said water treatment side of said central housing and includes longitudinal channels providing for water flow therethrough.

8. The water treatment device of claim 1 wherein;

said water treating chemical insert includes a rod extending longitudinally therethrough and having an upper end and a lower end extending from said water treating chemical insert, said rod thereby providing a space between each end of said water treating chemical insert to facilitate water flow therethrough.

9. The water treatment device of claim 8 wherein;

said upper end of said rod includes an upper disc concentrically secured thereto and said lower end of said rod includes a lower disc concentrically secured thereto, said upper disc closely conforming to said water treatment side of said central housing and said lower disc closely conforming to said lower circulation space within said lower cap, whereby said rod and said water treating chemical insert are concentrically retained within said hollow interior of said central housing to facilitate water flow therethrough.

10. The water treatment device of claim 1 wherein;

said water treating chemical insert is completely enclosed in a screen, whereby dislodged fragments of said water treating chemical insert are precluded from blocking said water outlet of said water treatment device.

* * * * *